UNITED STATES PATENT OFFICE.

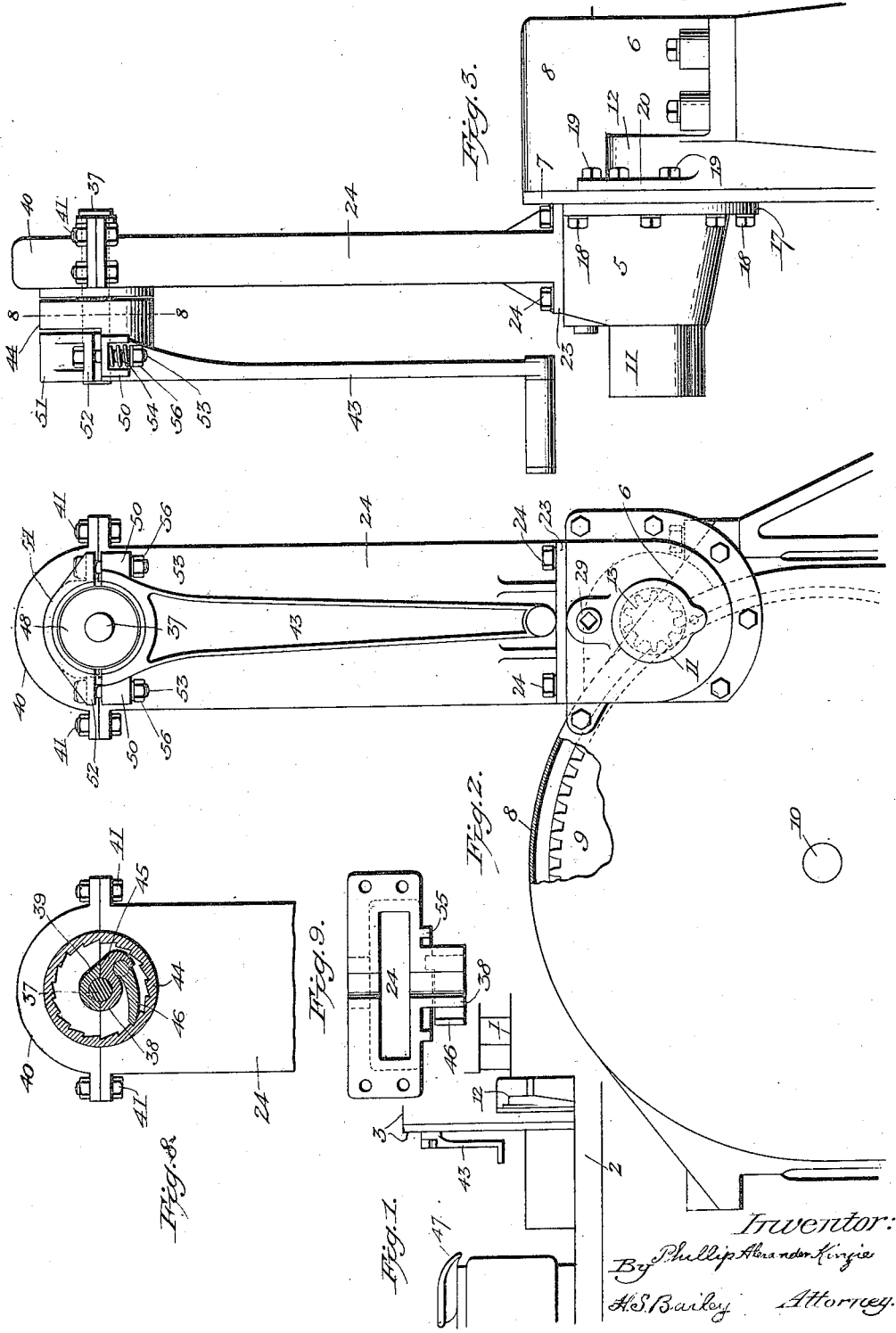

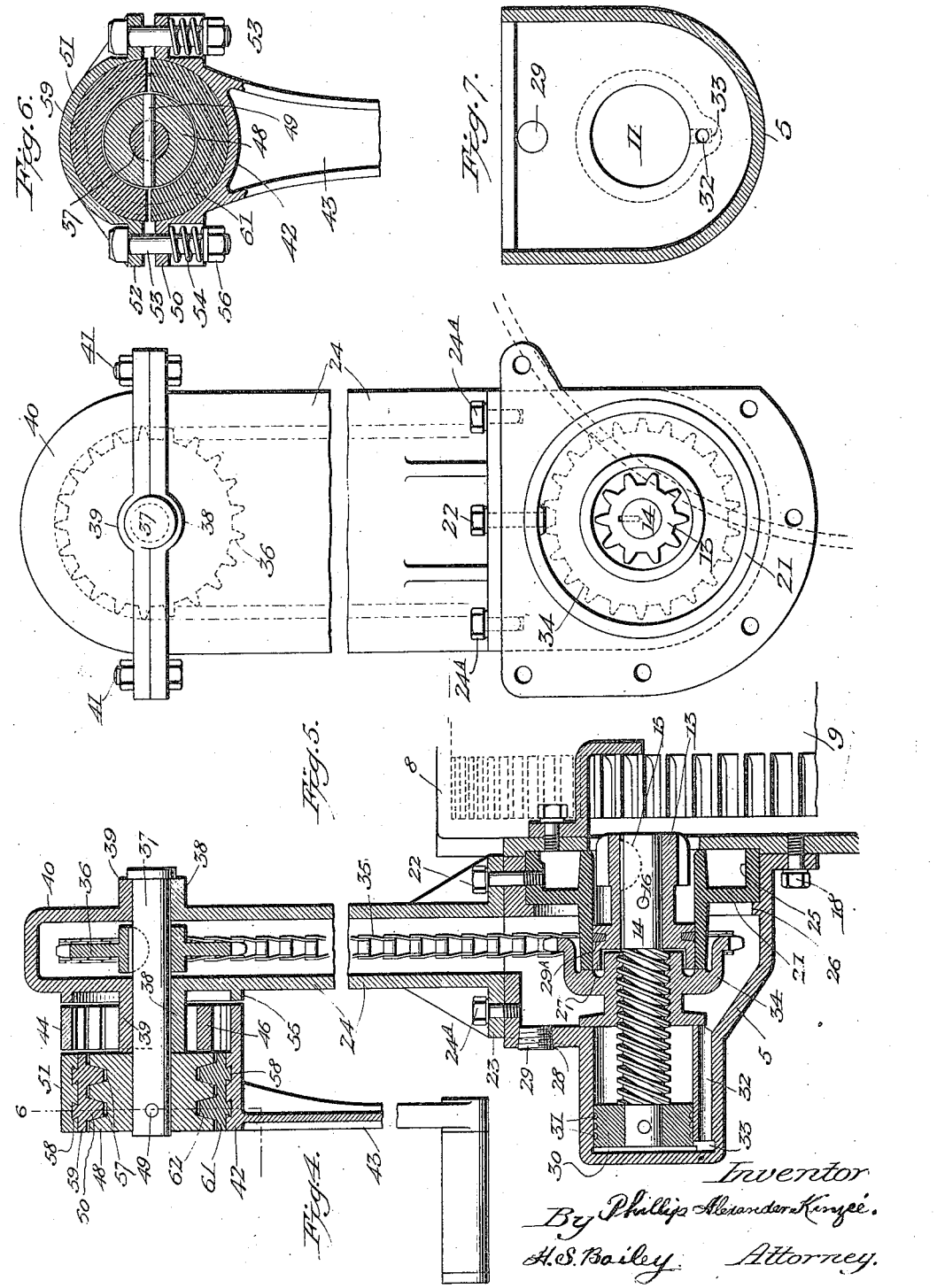

PHILLIP ALEXANDER KINZIE, OF LITTLETON, COLORADO.

CRANKING MECHANISM FOR TRACTOR, TRUCK, AND OTHER HEAVY-DUTY ENGINES.

1,424,485. Specification of Letters Patent. Patented Aug. 1, 1922.

Application filed December 16, 1920. Serial No. 431,239.

*To all whom it may concern:*

Be it known that I, PHILLIP ALEXANDER KINZIE, a citizen of the United States of America, residing at Littleton, county of Arapahoe, and State of Colorado, have invented a new and useful Cranking Mechanism for Tractor, Truck, and Other Heavy-Duty Engines, of which the following is a specification.

My invention relates to a new and improved cranking mechanism for tractor and truck and other heavy duty internal combustion engines.

And the objects of my invention are:

First: To provide a cranking mechanism for heavy duty engines, in which a power multiplying and transmitting mechanism is used to rotate the crank shaft of the engine.

Second: To provide a cranking mechanism for traction engines that is positioned in front of the driver's seat and that is arranged to enable the driver to crank the engine of the tractor without leaving his seat.

Third: To provide an easily operated cranking mechanism for heavy duty internal combustion engines, that is immersed in oil and that automatically locks itself against backward rotary or kicking movement, and in so doing, affords protection and safety to the operator and to the mechanism involved.

I attain these objects by the mechanism illustrated in the accompanying drawings, in which:

Figure 1, is a fragmental diagrammatic side view of a portion of a tractor and its engine, showing the position of the cranking lever with respect to the driver's seat.

Fig. 2 is a front elevation of the cranking mechanism, showing the same bolted to the end of the fly wheel casing.

Fig. 3 is a side view of Figure 1.

Fig. 4 is an enlarged vertical sectional view through the cranking mechanism.

Fig. 5 is a rear view of the same, detached.

Fig. 6 is a transverse sectional view, through the hub of the operating crank, on the line 6—6.

Fig. 7 is a transverse sectional view through the casing which surrounds the flywheel operating pinion and parts connected therewith.

Fig. 8 is a sectional view on the line 8—8 of Figure 3. And

Fig. 9 is a top view of the combined sprocket chain housing and supporting standard for the shaft of the crank lever.

Referring to the accompanying drawings:

The numeral 1, designates a heavy duty internal combustion engine in side elevation, with my improved cranking mechanism operatively connected to it.

In this side elevation, the numeral 2, designates the outside side plates or boards of a tractor, and the engine is bolted or otherwise secured to these side boards.

The engine sets inside of a surrounding hood member 3, and is provided with a bell housing 8, that is secured to the tractor, and this housing member is provided with an integrally formed flat surface portion 6, and to this flat portion a flange member 7, is secured which forms a part of the bell housing 8, and this bell housing 8, forms an enclosing housing member for the fly wheel 9, of the engine.

The fly wheel 9, is secured to the crank shaft 10, of the engine, and the rearward portion of its peripheral surface is provided with gear teeth, the bell housing 8, completely surrounding the fly wheel.

The peripheral surface of this casing is provided with an integral housing 12, that surrounds loosely a spur tooth pinion 13, which meshes with the teeth on the periphery of the fly wheel.

The pinion 13, is secured on a shaft 14, preferably by a semicircular key 15, to prevent its turning rotatably on the shaft, and also by a pin 16, to prevent its longitudinal movement on the shaft 14, and the outer ends of the teeth of the pinion 13, as well as the adjacent ends of the gear teeth of the fly wheel, are tapered or round so that those of the pinion will enter between the teeth of the fly wheel without striking against their ends.

A cylindrical casing 5, is bolted to the flange 7, which is, in turn, bolted to the housing 8, and this cylindrical casing has a projecting integral cylinder 11, formed on its outer end. The front end of the casing 5. is open the full size of its interior diameter, but is closed by the flange 7, to which a flange 17, on the said open end of casing 5, is bolted by cap screws 18, and this flange plate 7, which closes the cylinder 5, is secured by cap screws 19, to an arc-shaped flange portion 20, that is formed on the end of the casing 12, of the hood 8, of the fly wheel. The main body portion of my cranking mechanism which consists of the cylindrical casing 5, and its interior parts, is secured to the flange 7, and the pinion 13, is arranged to rotate the fly wheel when it is desired to crank the engine to start it, as will be hereinafter fully explained.

The main body portion of the casing 5, is provided with a removable sleeve 21, that is secured to the inner wall of the casing by a cap screw 22, which extends freely down through foot flanges 23, that are formed in the lower end of a long sprocket chain housing box 24, that extends vertically up from a top flat portion that is formed on the top of the cylinder, to which it is rigidly but removably secured by cap screws 24A. The lower end of the cap screw 22, is threaded into a flat flange member 25, that forms the peripheral portion of the sleeve 21, which projects into the open end portion of the casing and abuts against an annular shoulder 26, formed therein. The ends of the cap screws 24A, are threaded into the top surface of the casing 5. The interior surface of the axle aperture through the sleeve 21, is bored out and ground to a smooth surface, and the pinion 13, that meshes with the fly wheel 9, is provided with an inwardly projecting hub portion 27, that is turned and ground to fit snugly into the axial aperture of the sleeve so that it will turn therein and also move reciprocally through it. The casing 5, is kept partially filled with oil, which is admitted through a threaded aperture 28, in its front wall, which is closed by a tapering plug 29. The hub portion 27, of the pinion 13, is provided with a circumferential groove 29A, that is filled with a suitable packing material to prevent oil passing from the casing 5, past the hub of the pinion into the fly wheel housing. The small cylinder 11, on the outer end of the casing 5, is provided with an interiorly bored out and ground axle bore, which is preferably of the same size as the bore in the sleeve 21, and a piston head 30, which is secured to the adjacent end of the shaft 14, is ground to fit snugly in this bore. This piston head is preferably provided with oil grooves 31, and in the bottom portion of the shell of the cylinder 11, an oil passage 32, is formed which extends from the main chamber portion of the casing 5, to the rear end of the bore of the cylinder 11, and a hole 33, connects this end of the passage 32, with the said cylinder bore, which permits oil to flow from the main chamber to the rear end of the piston head 30, and vice versa.

The shaft 14, is threaded between the piston 30, and the end of the pinion hub 27, to turn freely in a thread hole, formed in the sprocket wheel 34, that is mounted rotatably in the chamber of the cylinder 5, between the end of the sleeve 21, and the end wall of the casing 5. This threaded bore sprocket wheel 34, is connected by a sprocket chain 35, to a sprocket wheel 36, that is secured upon a shaft 37, that is supported in hub bearings 38 and 39, formed respectively on the upper end of the sprocket chain box 24, and on a cap member 40, which encloses the sprocket wheel 36, and is removably secured to the top of the box by bolts 41.

The shaft 37, extends far enough beyond the rear side of the sprocket chain box and its cap to receive and indirectly carry at its end, the lower half of the hub portion 42, of a crank handle 43. The hub portion 42, has integrally formed thereon, a ring or band 44, the interior face of which is provided with ratchet teeth. The ratchet toothed ring surrounds concentrically and is spaced from the hub bearings 38 and 39, and the hub bearing 38, is provided with an integrally formed lug or projection 45, which is provided with a circular recess, in which the heel end of a gravity pawl 46, is mounted and fits loosely, while the free end of the pawl is held by its weight in the ratchet teeth of the ring 44, of the crank lever's lower hub portion. The crank lever 43, depends from the hub member 42, and normally hangs vertically downward in front of the driver's seat 47, and consequently in front of the driver of the tractor's engine, who sits within easy reach of its handle. This hub portion 42, of the crank lever surrounds the lower half of the solid round drum 48, that is secured to the outer end portion of the shaft 37, by a pin 49. The upper end of the hub 42, of the crank lever is provided with laterally projecting bolt receiving lugs 50, and a cap 51, extends over the drum 48, and is provided with lateral lug portions 52, that are bolted to the lower lugs 50, of the hub 42, by bolts 53, that extend down through the lugs 50, far enough to receive on each bolt a coiled expansive tension spring 54, that sits in recesses that are formed in the lower lugs 50. The cap 51, only covers the drum 48, and it extends from the outer end of the shaft 37, to the end of the hub members 38 and 39, on the cap 40, and upper end of the sprocket chain's housing box. The internal ratchet toothed ring or band 44, is placed between the cap 51, of the drum 48, and sprocket wheel box cap 40, at a sufficient space from them to rest freely between the drum 48, and its cap and the upper part of the adjacent side of the cap 40, and of the sprocket wheel and chain housing box 24, and an annular rib 55, that is formed in the cap 40, and on the chain box 24, acts as an inside abutment for the said band 44, and the lower part of the hub of the crank lever.

The lugs 52, of the cap 51, of the drum 48, and the lugs 50, of the drum's bearings in the hub 49, of the crank lever, are spaced a short distance apart, and they are cooperatingly arranged to divide this distance on equal sides of the center of the shaft 37, and thus space is provided to allow a resiliently yielding clamping pressure to be applied to the drum by drawing the cap 51, down against the drum and the drum against its bearings in the hub of the crank lever, by turning the nuts 56, on the bolts 53, to tighten the expansive tension of the coiled springs 54, sufficiently to enable the crank to grip the drum with sufficient pressure to turn the shaft 37, and consequently the sprocket wheel 36, its chain 35, and the sprocket wheel 34, in the casing 5, which, as it is turned, causes the threaded shaft 14. to travel through the sprocket wheel 34, and move the pinion endwise into mesh with the teeth of the fly wheel 9, of the engine, the direction of lateral movement of the shaft and its pinion depending on the relative direction of rotation of the shaft 14, with the rotation of the sprocket wheel 36, which is always towards the right hand of the driver of the car as he turns the crank lever to the right to crank the engine.

The crank lever's drum bearing is provided with an anti-friction lining of any predetermined metal, preferably of Babbitt metal, and the peripheral surface of the drum 48, is provided with V-shaped grooves 57, and the inner wall of the cap 51, and also the lower bearings for the drum in the hub of the crank lever are provided with dove tailed anchor holes 58, to prevent the lining from turning in the cap 51, and the crank 42. A semicircular piece of Babbitt metal 59, is secured in the dove tail grooves in the cap 51, and is formed with semicircular ribs 60, which fit in the annular grooves 57, of the drum 48, the babbitt being first melted and run into the grooves of the cap or drum, in any suitable manner. A similar semicircular piece of Babbitt metal 61, having semicircular ribs 62, is secured in the hub member 42, in the same manner as in the case of the piece 59, and these semi-circular pieces of Babbitt metal constitute the gripping elements by which the crank is secured to the drum 48.

The operation of my improved cranking mechanism for traction and other heavy duty engines, is as follows:

When the driver of a tractor desires to start his engine, he simply grasps the handle of the crank lever, either from his sitting position on the seat, or standing up in front of it in a position to sit down in it, and he turns the handle of the crank lever to the right, which imparts a rotary motion to the drum 48, by the resilient friction gripping pressure of the semicircular members 59 and 61, of the crank lever on the drum 48, and from the drum to the shaft 37, and the sprocket wheel 36, its chain 35, and the sprocket wheel 34, and from it to the shaft 14. The driver continues to turn the crank lever, and the threaded shaft having a frictional reluctance to rotate, due to the friction of the packing, contained in the hub portion of the pinion, against the cylindrical surface of the bore, causes the sprocket wheel to rotate upon it, and as the sprocket wheel is confined and prevented from endwise movement by the sleeve 21 and end wall of the casing 5, the shaft 14, with pinion 13, moves towards the fly wheel and the pinion 13, enters the teeth of the fly wheel; and the driver continues this crank turning movement until the full length of the pinion has entered the full length of the gear teeth on the fly wheel, and as soon as this takes place, the piston head has been moved through its cylindrical bore up against the hub of the sprocket wheel, which locks the shaft to the sprocket wheel and prevents any further longitudinal movement of the pinion into the teeth of the fly wheel, and at the same time causes the threaded shaft to begin rotation as a unit with the sprocket wheel.

The pressure the driver has to apply to the crank lever to turn the pinion shaft to move the pinion fully into the teeth of the fly wheel is very nominal, and this amount of the rotary movement of the crank lever can be very rapidly done; but the instant the threads of the shaft become locked to the sprocket wheel 34, the driver has to apply considerably more pressure to the crank lever, and he does this instantly, continuously without stopping the turning of the crank lever in the same direction, which then causes the pinion to turn the fly wheel, and as at this end of the cranking movement the driver turns the crank lever as fast as he can, the pinion spins the fly wheel.

The relative pressure or power transmitted from the crank through the threaded sprocket wheel to the threaded shaft is multiplied about ten to one, so that the driver easily rotates the fly wheel, and the motor, together with the timing and ignition mechanism supplied therewith, now being in motion, a series of sparks are generated that ignite the explosive mixture in the cylinders of the engine and start it to running, and the instant the engine starts to running, the pinion 13, is rotated very rapidly by the action of the fly wheel of the now running motor, and as the pinion and its shaft is now rotating much faster than the sprocket wheel which is being rotated by the cranking of the operator, the pinion consequently screws the threaded shaft back into the threaded sprocket wheel, so that it moves away from engagement with the teeth of the fly wheel with a high axial or endwise velocity, and in so doing, the piston upon the opposite end of the threaded shaft compresses the oil contained in the cylindrical chamber and forces the oil out of the chamber through the constricted passage, so that as soon as the teeth of the pinion are freed from engagement with the teeth of the fly wheel, the high axial or endwise velocity of the pinion, the threaded shaft and the piston, is quickly retarded and cushioned by the action of the piston against the oil, as above described. It then comes to rest in the fully withdrawn position, as shown. Then the piston and its shaft stop. Consequently, when the engine starts running, the driver of the tractor car releases the crank lever, as it is locked by the pawl on the shaft 37, to the sleeve of the crank lever and cannot turn backward when and while the threaded shaft, its pinion and its piston are moving rearwardly in the casing 5.

Should the motor back fire or "kick back," as sometimes occurs when the mechanism fires the explosive mixture prematurely, this reverse or backward rotary movement transmitted to the pinion so caused, is instantly transmitted to the shaft 37, and the pawl, which is always in mesh with the ratchet teeth of the sleeve 44, prevents the crank lever from turning or kicking backward; but the pinion, the threaded shaft, the sprockets, chain, shaft and drum rotate very rapidly for a moment against the frictional resistance between the drum and the crank, set up by the coil springs on the clamp bolts, so that the mechanism is protected from injury from this action, as well as the operator.

My invention is especially adapted to be applied, and in fact, cannot be used except on heavy duty internal combustion engines that are provided with a magneto equipped with an impulse spark generating starter or else with an auxiliary battery ignition system, both of which are well known to those skilled in the art, and consequently need no description or illustration within this present application; the reason for which is that the engine is geared up to such a high degree of speed that it would be impracticable to spin the motor fast enough to obtain a spark of sufficient intensity to ignite the explosive mixture within the cylinders, where a magneto without the impulse starter, or the battery ignition equipment, was used.

My invention provides a strong, powerful and practical cranking mechanism for the engines of tractors, that can be operated from the driver's seat and thus avoids the necessity of the driver getting off of the tractor and going to the front end or side of it every time he desires to start his engine; and while I have illustrated its preferred construction, I do not wish to be limited to it, as changes may be made in it without departing from the spirit of my invention.

Having described my invention, what I claim as new and desire to secure by Letters Patent, is:

1. A cranking mechanism for engines, provided with a fly wheel, a crank provided with means including an adjustable friction gripping and a cooperating ratchet and pawl mechanism, means connected and driven by said crank for engaging and spinning said fly wheel, said crank being arranged to disengage itself from said fly wheel, a shaft on which said crank and its friction gripping and pawl mechanism is mounted, said ratchet member forming a part of said crank and being arranged to surround the pawl on said shaft, whereby said crank adjustably grips with frictional pressure said drum and rotates said shaft within said ratchet, a sprocket wheel mounted on said crank driven shaft, said fly wheel spinning means comprising a shaft arranged to move reciprocally, and rotatably mounted on said sprocket wheel, a sprocket chain connected to said crank shaft's sprocket wheel and to said reciprocating shaft's sprocket wheel, and arranged to intermittently reciprocate and rotate said fly wheel spinning shaft.

2. A cranking mechanism for engines, provided with a fly wheel, a crank provided with means including an adjustable friction gripping and a cooperating ratchet and pawl mechanism, means connected and driven by said crank for engaging and spinning said fly wheel, said crank being arranged to disengage itself from said fly wheel, a shaft on which said crank and its friction gripping and pawl mechanism is mounted, said ratchet member forming a part of said crank and being arranged to surround the pawl on said shaft, whereby said crank adjustably grips with frictional pressure said drum and rotates said shaft within said ratchet, a sprocket wheel mounted on said crank driven shaft, said fly wheel spinning means comprising a shaft arranged to move reciprocally, and rotatably mounted on said sprocket wheel, a sprocket chain connected to said crank shaft's sprocket wheel and to said reciprocating shaft's sprocket wheel and arranged to intermittently reciprocate and rotate said fly wheel spinning shaft, said fly wheel being provided with gear teeth and said reciprocating shaft being provided with a pinion arranged to be moved into and out of engagement with said fly wheel's gear teeth by the rotating movement imparted to its sprocket wheel by said crank and its sprocket wheel, and by the fly wheel.

3. A cranking mechanism for engines, provided with a fly wheel, a crank provided with means including an adjustable friction gripping and a cooperating ratchet and pawl mechanism, means connected and driven by said crank for engaging and spinning said fly wheel, said crank being arranged to disengage itself from said fly wheel, a shaft on which said crank and its friction gripping and pawl mechanism is mounted, said ratchet member forming a part of said crank and being arranged to surround the pawl on said shaft, whereby said crank adjustably grips with frictional pressure said drum and rotates said shaft within said ratchet, a sprocket wheel mounted on said crank driven shaft, said fly wheel spinning means comprising a shaft arranged to move reciprocally, and rotatably mounted on said sprocket wheel, a sprocket chain connected to said crank shaft's sprocket wheel and to said reciprocating shaft's sprocket wheel and arranged to intermittently reciprocate and rotate said fly wheel spinning shaft, said fly wheel being provided with gear teeth and said reciprocating shaft being provided with a pinion arranged to be moved into and out of engagement with said fly wheel's gear teeth by the rotating movement imparted to its sprocket wheel by said crank and its sprocket wheel, and by said fly wheel, said reciprocating shaft and its driving sprocket wheel being mounted in an enclosed casting, and said shaft having a threaded portion threaded to its driving sprocket wheel, a piston head on the opposite end of said shaft from its pinion end, reciprocally mounted in said casting.

4. A cranking mechanism for engines, provided with a fly wheel, a crank provided with means including an adjustable friction gripping and a cooperating ratchet and pawl mechanism; means connected and driven by said crank for engaging and spinning said fly wheel, said crank being arranged to disengage itself from said fly wheel, a shaft on which said crank and its friction gripping and pawl mechanism is mounted, said ratchet member forming a part of said crank and being arranged to surround the pawl on said shaft, whereby said crank adjustably grips with frictional pressure said drum and rotates said shaft within said ratchet, a sprocket wheel mounted on said crank driven shaft, said fly wheel spinning means comprising a shaft arranged to move reciprocally, and rotatably mounted on said sprocket wheel, a sprocket chain connected to said crank shaft's sprocket wheel and to said reciprocating shaft's sprocket wheel and arranged to intermittently reciprocate and rotate said fly wheel spinning shaft, said fly wheel being provided with gear teeth and said reciprocating shaft being provided with a pinion arranged to be moved into and out of engagement with said fly wheel's gear teeth by the rotating movement imparted to its sprocket wheel by said crank and its sprocket wheel, and by said fly wheel, said reciprocating shaft and its driving sprocket wheel being mounted in an enclosed casting, and said shaft having a threaded portion threaded to its driving sprocket wheel, a piston head on the opposite end of said shaft from its pinion end, reciprocally mounted in said casting, said pinion end of said shaft being reciprocally mounted in said casting, and means for admitting and retaining a supply of oil in said casting.

5. The combination with an internal combustion engine provided with a fly wheel provided with a circumferential row of gear teeth and surrounded by a hood, a casing arranged to be secured to said hood and provided with a pinion arranged to be engaged and disengaged to the teeth of said fly wheel, and means including a crank lever arranged to rotate said pinion, said pinion being secured to one end of a shaft, a piston head on the opposite end of said shaft, thread on said shaft between said pinion and said piston head, a cylindrical portion in said casing in which said piston head end of said shaft reciprocates, a sleeve in said casing in which the pinion end of said shaft is reciprocally mounted, a sprocket wheel threadedly mounted on said shaft, a driven sprocket wheel connected to said crank lever to be rotated thereby, and connected by a sprocket chain to said shaft's threaded sprocket wheel for reciprocally moving said shaft to move said pinion into and out of engagement with the teeth of said fly wheel, and for intermittently rotating said shaft and pinion to spin said fly wheel.

6. The combination with an internal combustion engine provided with a fly wheel provided with a circumferential row of gear teeth and surrounded by a hood, a casing arranged to be secured to said hood and provided with a pinion arranged to be engaged and disengaged to the teeth of said fly wheel, and means including a crank lever arranged to rotate said pinion, said pinion being secured to one end of a shaft, a piston head on the opposite end of said shaft, a thread on said shaft between said pinion and said piston head, a cylindrical portion in said casing in which said piston head end of said shaft reciprocates, a sleeve in said casing in which the pinion end of said shaft is reciprocally mounted, a sprocket wheel threadedly mounted on said shaft, a driven sprocket wheel connected to said crank lever to be rotated thereby, and connected by a sprocket chain to said shaft's threaded sprocket wheel for reciprocally moving said shaft to move said pinion into and out of engagement with the teeth of said fly wheel and for intermittently rotating said shaft and pinion to spin said fly wheel, a crank lever supporting shaft extending through said driven sprocket, a drum keyed to said crank shaft, an anti-friction lining bearing on said crank shaft surrounding said drum, and resilient means including bolts for adjustably clamping said crank lever to said drum.

7. The combination with an internal combustion engine provided with a fly wheel provided with a circumferential row of gear teeth and surrounded by a hood, a casing arranged to be secured to said hood and provided with a pinion arranged to be engaged and disengaged to the teeth of said fly wheel, and means including a crank lever arranged to rotate said pinion, said pinion being secured to one end of a shaft, a piston head on the opposite end of said shaft, a thread on said shaft between said pinion and said piston head, a cylindrical portion in said casing in which said piston head end of said shaft reciprocates, a sleeve in said casing in which the pinion end of said shaft is reciprocally mounted, a sprocket wheel threadedly mounted on said shaft, a driven sprocket wheel connected to said crank lever to be rotated thereby, and connected by a sprocket chain to said shaft's threaded sprocket wheel for reciprocally moving said shaft to move said pinion into and out of engagement with the teeth of said fly wheel and for intermittently rotating said shaft and pinion to spin said fly wheel, a crank lever supporting shaft extending through said driven sprocket, a drum keyed to said crank shaft, an anti-friction lining bearing on said crank shaft surrounding said drum, and resilient means including bolts for adjustably clamping said crank lever to said drum, a sprocket chain housing box secured to said casing and upwardly therefrom, provided with a bearing supporting said shaft and extending towards said crank's lever, a pawl member mounted on said bearing, and an internal ratchet tooth sleeve on said crank lever and arranged to surround said bearing and to be engaged by said pawl, and means for providing said casing with a supply of oil.

8. In a cranking device of the character described, the combination with an internal combustion engine crank shaft having a toothed fly wheel thereon, of a starting pinion for said fly wheel, a shaft upon one end of which said fly wheel is rigidly secured, said shaft being capable of both a rotary and an endwise movement and having a threaded extension, a piston on the opposite end of said shaft, a casing enclosing said shaft, having an oil chamber, a cylinder in said chamber for said piston, and communicating at each end with said oil chamber, a drive wheel in threaded engagement with the threaded portion of said shaft, and means for preventing endwise movement of the same, means for rotating said drive wheel, whereby said shaft is moved through said drive wheel to cause its pinion to mesh with the flywheel, said piston engaging said drive wheel when the shaft reaches the limit of its forward movement, whereby the shaft is locked to and is turned by said drive wheel, thus causing the pinion to turn the fly wheel, said shaft's axial movement being reversed when the fly wheel is actuated by the starting of the engine, whereby it is moved rapidly backward through said drive wheel, thus disconnecting the pinion from the fly wheel, and means for preventing reverse movement of the drive wheel during the reverse axial movement of said shaft.

9. In a cranking device of the character described, the combination with a combustion engine crank shaft having a toothed fly wheel thereon, a shaft having both a rotary and an endwise movement, a starting pinion for said fly wheel on said shaft, said shaft having a threaded portion, a sprocket wheel threaded to the threaded portion of said shaft, and means for preventing endwise movement of the same, of a driving shaft, a sprocket wheel thereon and a chain connecting the same with the first mentioned sprocket wheel, a circular block rigidly mounted on the driving shaft, a crank handle having a ratchet band and a semicircular hub portion, a semicircular friction member in said hub portion adapted to engage the under half of said circular block, a semicircular cap, a semicircular friction member thereon adapted to engage the upper half of said block, bolts passing through said cap and said hub portion, coil springs on the extended portion of said bolts, and nuts screwed against said springs, whereby said cap is held to said hub portion and said friction members are thereby caused to tightly but yieldingly clamp said circular block, whereby said driving shaft is turned by said crank handle, and a pawl in engagement with said ratchet band, whereby forcible back rotation of said crank handle is prevented, the driving shaft block turning between its clamping members.

In testimony whereof I affix my signature in presence of two witnesses.

PHILLIP ALEXANDER KINZIE.

Witnesses:
G. SARGENT ELLIOTT,
ELIZABETH SMITH.